Figure 1:
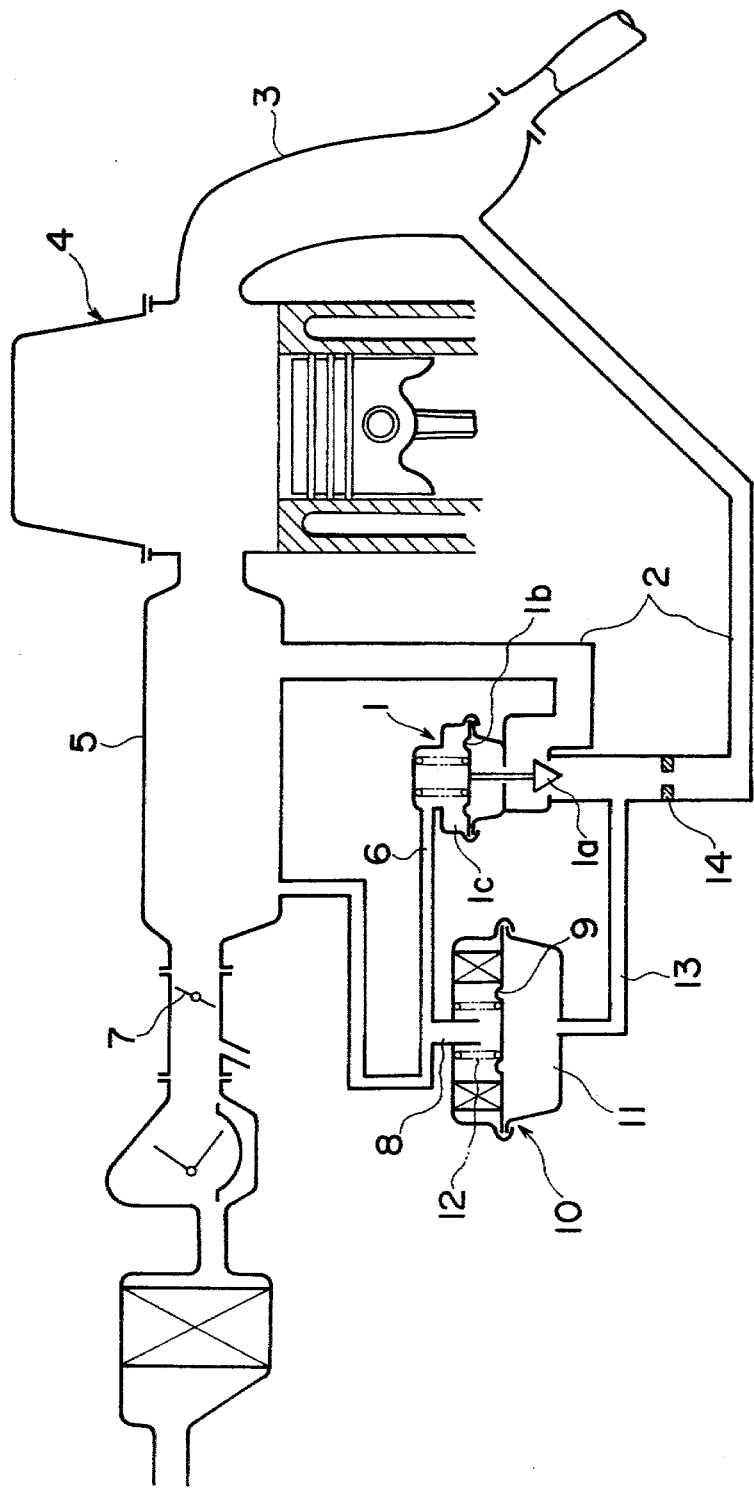

United States Patent [19]
Okamura

[11] 4,245,606
[45] Jan. 20, 1981

[54] EGR CONTROL SYSTEM FOR INTERNAL COMBUSTION ENGINE

[75] Inventor: Kenji Okamura, Yokohama, Japan

[73] Assignee: Nissan Motor Company, Limited, Yokohama, Japan

[21] Appl. No.: 969,022

[22] Filed: Dec. 13, 1978

[30] Foreign Application Priority Data

Dec. 26, 1977 [JP] Japan .............................. 52/155720

[51] Int. Cl.³ .............................................. F02B 47/08
[52] U.S. Cl. ...................................... 123/568; 123/571
[58] Field of Search .................................... 123/119 A

[56] References Cited
U.S. PATENT DOCUMENTS 4,150,642  4/1979  Inada et al. ...................... 123/119 A
4,173,204  11/1979  Takayama et al. ............... 123/119 A

*Primary Examiner*—Wendell E. Burns
*Attorney, Agent, or Firm*—Schwartz, Jeffery, Schwaab, Mack, Blumenthal & Koch

[57] ABSTRACT

An EGR control system for an internal combustion engine, comprises an EGR passage connecting between the intake and exhaust passages of the engine and formed with an orifice therein, an EGR control valve for controlling the amount of exhaust gas passing through the EGR passage, a regulating valve for controlling the operation of the EGR control valve, and a device, for changing a preset condition of the regulating valve in accordance with engine operating conditions, so that EGE rate can be controlled to desirable values from view points of driveability and fuel economy.

10 Claims, 3 Drawing Figures

EGR CONTROL SYSTEM FOR INTERNAL COMBUSTION ENGINE

This invention relates, in general, to an exhaust gas recirculation (EGR) control system for recirculating a portion of engine exhaust gases back to the engine, and more particularly to an improvement in the EGR control system of so-called exhaust pressure controlled type wherein EGR rate is controlled in accordance with engine operating conditions.

It is a principal object of the present invention to provide an improved EGR control system which overcome the problems encountered in prior art EGR control systems of exhaust pressure controlled type.

It is another object of the present invention is to provide an improved EGR control system by which EGR rate can be controlled in accordance with engine operating conditions and accordingly desirable EGR rate characteristics is attained, maintaining good driveability and good fuel economy.

It is a further object of the present invention to provide an improved EGR control system of exhaust pressure controlled type, in which exhaust pressure for regulating EGR rate is substantially corrected in accordance with engine operating conditions by changing a preset condition of a regulating valve in response to engine operating conditions.

It is a still further object of the present invention to provide an improved EGR control system of exhaust pressure control type, by which EGR rate can be controlled to be decreased at a particular engine operating condition such as high speed and load engine operating condition wherein good driveability and good fuel economy are required.

Figure 2:
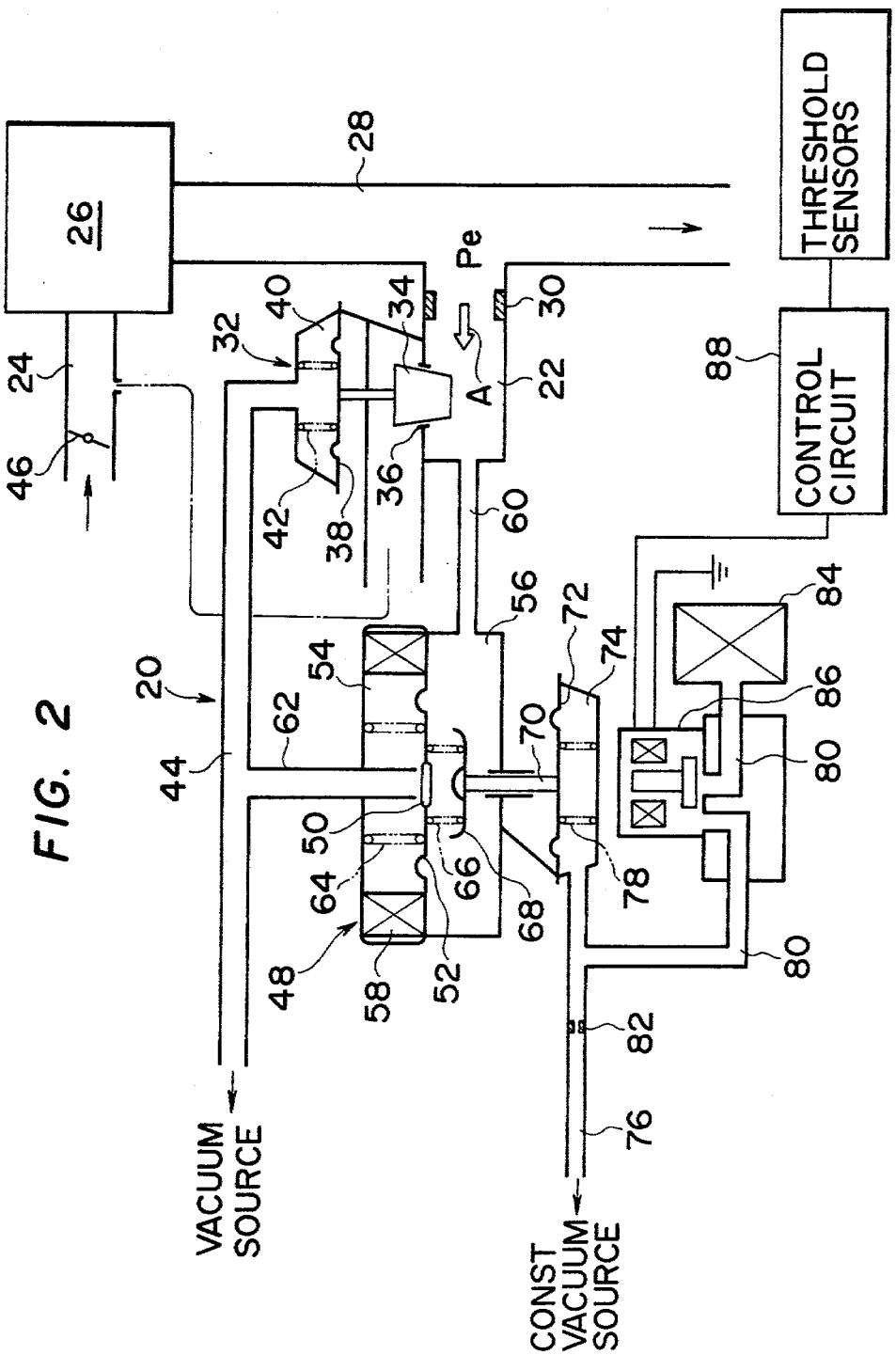
Figure 3:
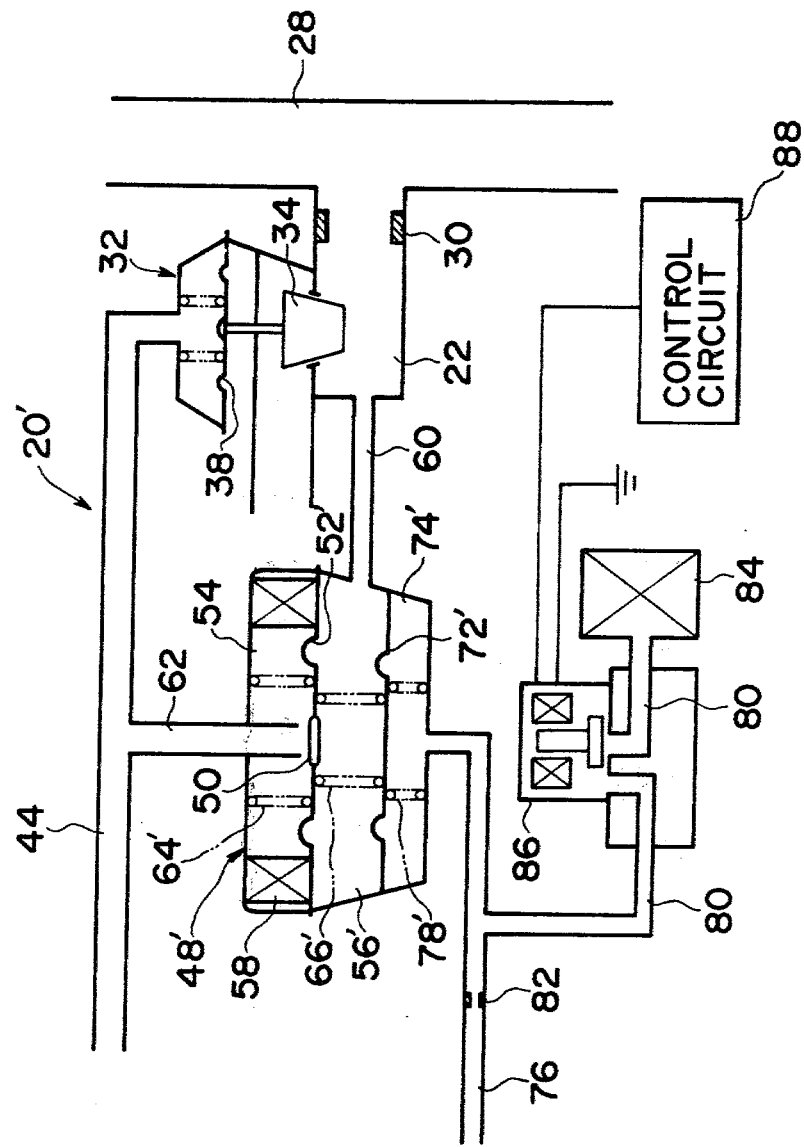

Other objects, features and advantages of the improved EGR control system according to the present invention will be more apparent from the following description taken in conjunction with the accompanying drawings, in which FIG. 1 is a schematic cross-sectional view of an example of an EGR control system of exhaust pressure controlled type;

FIG. 2 is a schematic cross-sectional view of a preferred embodiment of an EGR control sytem in accordance with the present invention; and FIG. 3 is a schematic cross-sectional view similar to FIG. 2, but showing another preferred embodiment of the EGR control system in accordance with the present invention.

It is well known in the art that a portion of engine exhaust gases is recirculated back to engine combustion chambers in order that the peak combustion temperature is lowered to suppress generation of nitrogen oxides (NOx) in the combustion chambers. The amount of the recirculated exhaust gases severely affect engine power output characteristics and therefore precise control of the recirculated exhaust gas has been eagerly desired.

In this regard, a variety of exhaust gas control (EGR) systems have been proposed. With reference to FIG. 1, an example of prior art EGR control systems of so-called exhaust pressure controlled type will be explained hereinafter: An EGR control valve 1 is operatively disposed in an EGR passage 2 which connects an exhaust gas passageway 3 of an internal combustion engine 4 to an intake passageway 5 of the engine 4. The EGR control valve 1 is provided with a valve head 1a connected to a diaphragm 1b. The diaphragm 1b defines a vacuum operating chamber 1c which communicates through a vacuum conduit 6 with the intake passageway 5 downstream of a throttle valve 7. The vacuum conduit 6 is branched off to form an air induction pipe 8 which extends adjacent a diaphragm 9 of a regulating valve assembly 10. The diaphragm 9 defines a pressure operating chamber 11 and is normally biased by a spring 12 so that the diaphragm 9 is spaced apart from the open tip of the air induction pipe 8. The pressure operating chamber 11 of the regulating valve assembly 10 is communicated through a pressure conduit 13 with the EGR passageway 2 between the EGR control valve 1 and an orifice 14 formed in the EGR passageway 2.

With the thus arranged EGR control system, the pressure in the EGR passageway 2 between the EGR control valve 1 and the orifice 14 is introduced into the pressure operating chamber 11 of the regulating valve assembly 10. When the pressure introduced into the pressure chamber 11 is lower than a preset level, the diaphragm 9 is kept separate from the tip of the air induction pipe 8 by the biasing force of the spring 12 to dilute the vacuum in the vacuum passage 6 with atmospheric air. As a result, the valve head 1a is moved toward its close position in order to increase the pressure in the EGR passage 2 between the EGR control valve 1 and the orifice 14, toward the preset level.

When the pressure introduced into the pressure operating chamber 11 of the regulating valve assembly 10 exceeds the preset level, the diaphragm 9 is moved upward against the biasing force of the spring 12 to close the open tip of the air introduction pipe 8. Accordingly, the dilution of the vacuum in the vacuum passage 6 is stopped. As a result, the valve head 1a of the EGR control valve 1 is moved toward its open position in order to decrease the pressure in the EGR passageway 2 between the EGR control valve 1 and the orifice 14, toward the preset level.

By repetition of the such operations, the pressure in the EGR passage 2 between the EGR control valve 1 and the orifice 14 is maintained at a constant level. As a result, EGR rate (exhaust gas recirculation amount/intake air amount) is determined by the relationship between the above-mentioned constant pressure and the pressure in the EGR passage 2 upstream of the orifice 14. Therefore, the EGR rate is controlled to a constant value.

However, such a control manner of EGR rate is not necessarily desirable, because driveability and fuel consumption (fuel economy) must be considered in addition to exhaust gas purification, in the operation of internal combustion engine. In other words, the above-mentioned constant exhaust gas recirculation rate results in an excessive EGR rate particularly during high speed engine operation, since driveability and fuel economy must be improved during such a high speed engine operation.

In view of the above, the present invention contemplates to overcome the above-discussed problems encountered in prior art EGR control system to exhaust pressure controlled type, so that the exhaust gas recirculation rate can be controlled to be changeable in accordance with the demands of various engine operating conditions.

Referring now to FIG. 2 of the drawing, there is illustrated a preferred embodiment of an EGR (exhaust gas recirculation) control system 20 of exhaust pressure controlled type, in accordance with the present invention. The EGR control system 20 comprises an EGR passage 22 which connects between an intake passageway 24 of an internal combustion engine 26 and an exhaust gas passageway 28 of the same engine. The intake passageway 24 provides communication between ambient air and a combustion chamber (not shown) or chambers of the engine 26 so that air-fuel mixture or air is supplied to the combustion chambers therethrough. The exhaust gas passageway 28 provides communication between the combustion chamber of the engine 26 and ambient air so that exhaust gas from the combustion chamber is discharged out of the engine 26. Accordingly, a portion of exhaust gases flows through the EGR passageway in the direction of an arrow A. The EGR passage 22 is formed at its inner surface with an orifice 30 for generating the pressure differential between the upstream and downstream side S of the orifice 30.

An EGR control valve 32 includes a movable valve head 34 which is seatable on a valve seat 36 formed in the EGR passage 22 downstream of the orifice 30. When the valve head 34 is seated on the valve seat 36, the communication between the upstream and downstream sides of the valve seat 36 is blocked. The valve head 34 is securely connected to a diaphragm 38 defining a vacuum operating chamber 40. The diaphragm 38 is normally biased by a spring 42 in the direction to cause the valve head 34 to seat on the valve seat 36. The vacuum operating chamber 40 communicates through a vacuum passage 44 with a vacuum source whose vacuum is variable in accordance with engine operating conditions. The variable vacuum is, for example, an intake manifold vacuum or the vacuum in the intake passageway 24 downstream of a throttle valve 46. It will be understood that the opening degree of the EGR control valve 32 or the amount of lift of the valve head 34 is controlled in response to the relationship between the biasing force of the spring 42 and the degree of a vacuum signal supplied to the vacuum operating chamber 40.

A regulating valve 48 includes a valve member 50 which is secured to the central portion of a first diaphragm 52 which is stretched inside of a casing (no numeral). The first diaphragm 52 separates the interior of the casing into an atmospheric chamber 54 and a pressure operating chamber 56. The atmospheric chamber 54 communicates through a filter 58 with ambient air. The pressure operating chamber 56 communicates through a pressure passage 60 with the EGR passage 22 between the EGR control valve 32 and the orifice 30. Opened adjacent and opposite to the valve member 50 is an air induction pipe 62 which is branched off from the vacuum passage 44 and through which air is introduced into the vacuum passage 44 to dilute the vacuum in the vacuum passage 44. When the open tip of the air induction pipe 62 is fully closed with the valve member 50, the vacuum signal from the vacuum source is directly transmitted to the vacuum operating chamber 40 of the EGR control valve 32. A first spring 64 is disposed in the atmospheric chamber 54 to bias the first diaphragm 52 in the direction to separate the valve member 50 from the open tip of the air induction pipe 62. A second spring 66 is disposed in the pressure chamber 56 to bias the first diaphragm 52 in the direction to cause the valve member 50 to close the open tip of the air induction pipe 62. A preset load applied to the diaphragm 52 or the valve member 50 is made by the relationship between first and second springs 64 and 66. As shown, the second spring 66 is retained between the first diaphragm 52 and a spring retainer 68 which is secured to a rod 70 which movably extends out of the pressure chamber 56, maintaining a gas-tight seal between the rod 70 and the casing of the regulating valve 48.

A second diaphragm 72 secured to the rod 70 defines a vacuum operating chamber 74 which communicates through a vacuum passage 76 with a constant vacuum source for supplying the vacuum passage with a constant vacuum. In this instance, the constant vacuum source may be composed of a pressure regulator (not shown) fluidly connected to the intake passageway 24. A third spring 78 is disposed in the vacuum operating chamber 74 to bias the second diaphragm 72 upward in the drawing. It is to be noted that the location of the retainer 68 is changeable with the movement the second diaphragm 72 and therefore the preset load of the diaphragm 52 is controlled to be changed in accordance with the relationship between the biasing force of the third spring 78 and the degree of the vacuum applied to the second diaphragm 72.

An air induction passage 80 is branched off from the vacuum passage 76 between the vacuum operating chamber 74 and an orifice 82 formed inside of the vacuum passage 76. The air induction passage 80 communicates through a filter 84 with ambient air. Otherwise, the air induction passage 80 may be connected to the intake passageway 24 upstream of the throttle valve 46, though not shown. An electromagnetic valve 86 is operatively disposed in the air induction passage to control air induction to the vacuum passage 76. The electromagnetic valve 86 is constructed and arranged to open to admit air through the passage 80 into the vacuum passage 76 when energized, and to close to prevent air from being admitted through the passage 80 into the vacuum passage 86 when de-energized. Such energization and de-energization are carried out when the valve 86 is supplied with energizing pulse signal and with de-energizing pulse signal, respectively, from a so-called microcomputer or a control circuit 88. Accordingly, the electromagnetic valve 86 is electrically connected to the control circuit 88. It wil be understood that the vacuum supplied into the vacuum operating chamber 74 is controlled by varying the time ratio of the energizing and de-energizing signals applied to the electromagnetic valve 86.

The control circuit 88 is, in turn, electronically connected to a variety of engine operating parameter threshold sensors, for example, for sensing engine speed, crankshaft rotational angle, throttle position, intake vacuum, intake air amount, intake air temperature, engine coolant temperature, the temperature of a catalyst of an exhaust system, the oxygen concentration in exhaust gases, engine starting motor operation, the gear position of a gear box, the operation of engine accessories etc. The control circuit 88 memorizes a various patterns of exhaust gas recirculation control which patterns have been previously set by experimentally deciding the optimum exhaust gas recirculation control pattern for each of various engine operating conditions which are to be sensed by the threshold sensors. For example, an exhaust gas recirculation control pattern is such that the EGR rate is increased to relatively high levels during acceleration and during medium speed and load engine operation which are encountered most frequently, while the EGR rate is decreased to relatively low levels during high vehicle speed cruising and during low speed and load engine operation, so that overall NOx and emission level is decreased preventing the degradation of fuel economy and engine power output characteristics and maintaining smooth driveability of a vehicle.

The control circuit 88 is further constructed and arranged to select the set exhaust gas recirculation control pattern corresponding to the engine operating condition, and generate the pulse signals having the time ratio of energizing and de-energizing valve 86, in accordance with the selected exhaust gas recirculation control pattern.

The operation of the EGR control system according to the present invention will be explained hereinafter with reference to FIG. 2.

Now, assuming the vacuum in the vacuum operating chamber 74 defined by the second diaphragm 72 is not varied to maintain a constant level, the exhaust pressure in the EGR passage 22 between the EGR control valve 32 and the orifice 30 is controlled to a constant level $P_1$ by the action of the regulating valve 48 since the biasing forces of the first and second springs 64 and 66 are constant, respectively. Accordingly, the EGR rate is controlled to a value corresponding to the difference between the pressure $P_e$ upstream of the orifice 30 and the pressure $P_1$ downstream of the orifice 30. Since the exhaust pressure in the EGR passage 22 is proportional to the amount of engine intake air, the amount of recirculated exhaust gas is controlled in accordance with the intake air amount and accordingly the EGR rate is maintained at the constant value.

When the engine operating parameter threshold sensors sense that the engine 26 is operated under high speed and load engine operating condition where the the vehicle cruises at a high vehicle speed, by detecting, for example, intake manifold vacuum, engine speed, the gear position in the gear box etc, the control circuit 88 selects an exhaust gas recirculation control pattern corresponding to the high speed and high load engine operating condition to generate the pulse signals having a time ratio of energizing and de-energizing the value 86, in accordance with the selected pattern of exhaust gas recirculation control. It will be appreciated that it is desirable to decrease the EGR rate during such an engine operating condition in order to obtain high engine power output and good driveability of the vehicle. In this instance, under such high speed and load engine operating condition, the time ratio of the de-energization is controlled to increase as compared with the time ratio of the energization. Accordingly, the time ratio of blocking communication between the vacuum passage 76 and ambient air is larger than the time ratio of the establishing the same communication.

Hence, the degree of diluting the vacuum in the vacuum passage 76 with air is decreased and therefore the vacuum in the vacuum operating chamber 74 increases. As a result, the second diaphragm 72 is moved downward in the drawing to move also the spring retainer 68 downward. In such a condition, since the second spring 66 is extended and the biasing force for raising the first diaphragm 52 is weakened, it is necessary to apply a higher pressure to the first diaphragm 52 than in the previous state, for the purpose of moving the second diaphragm 52 upward. This is substantially the same as in a case wherein the biasing force of the first spring 64 or the preset load of the first diaphragm 52 is increased. Otherwise, this also substantially the same as in other case wherein the exhaust pressure in the EGR passage 22 between the EGR control valve 32 and the orifice 30 is corrected to decrease the pressure in the chamber 56 of the regulating vlave 48 without changing the biasing forces of the first and second springs 64 and 68.

As a result, the opening or closing action of the tip of the air induction pipe 62 is accomplished relative to an increased exhaust pressure $P_2 (>P_1)$ in the EGR passage 22 between the EGR control valve 32 and the orifice 30. Therefore, when the exhaust pressure between the valve 32 and the orifice 30 increases over the level $P_2$, the tip of the air induction pipe 62 is closed to increase the vacuum in the vacuum operating chamber 40 of the EGR control valve 32, which causes a slight opening of the EGR control valve 40. This decreases the exhaust pressure between the EGR control valve 32 and the orifice by an amount over the level $P_2$. On the contrary, when the same exhaust pressure decreases below the level $P_2$, the tip of the air induction pipe 62 is opened to decrease the vacuum in the vacuum operating chamber 40 of the EGR control valve 32, which causes the EGR control valve to close. This increases the exhaust pressure between the EGR control valve 32 and the orifice 30 by an amount below the level $P_2$. With repetition of such operations, the pressure between the EGR control valve 32 and the orifice is maintained at the constant level $P_2$ and therefore the amount of recirculated exhaust gas is decreased, since the amount of recirculated exhaust gas is increased and decreased respectively with the increase and decrease of the pressure differential between the upstream and downstream sides of the orifice 30. Hence, the EGR rate is securely and smoothly decreased to maintain good driveability even during high vehicle speed cruising.

During the acceleration or the medium speed and load engine operation, strict control of NOx is required and takes precedence of engine performance. Accordingly, when the such engine operating conditions are sensed by the engine operating parameter threshold sensors, the control circuit 88 generates the pulse signals for increasing the time ratio of the opening of the electromagnetic valve 26 as compared with the time ratio of the closing of the same. As a result, dilution of the vacuum in the vacuum passage 76 with air is increased and accordingly the second diaphragm 72 is moved upward in the drawing to move the spring retainer 68 upward. Then, the second spring 66 is compressed and acts as if its biasing force is increased. Consequently, the first diaphragm 52 can be moved upward even at an exhaust pressure $P_3$ between the EGR control valve 32 and the orifice 30, which pressure $P_3$ is lower than the pressure $P_1$. The opening or closing action of the air induction pipe 62 is therefore accomplished relative to the pressure $P_3$, thereby maintaining the pressure between the EGR control valve 32 and the orifice 30 at the level $P_3$ which is below level $P_1$. As a result, the EGR rate is increased to achieve effective decrease in the NOx emission.

As is apparent from the foregoing, according to the present invention, control of the pressure downstream of the orifice 30 is, in practice, carried out continuously by the action of the computor 88 in order to achieve precise control of EGR rate in accordance with the engine operating conditions. Accordingly, a suitable control of the EGR rate can be achieved even at unstable engine operating range such as low speed and load engine operating range.

FIG. 3 illustrates another preferred embodiment of the EGR control system in accordance with present invention, which is essentially similar to that shown in FIG. 2 and, as such, like reference numerals are assigned to corresponding parts.

In this EGR control system 20′, the regulating valve 48′ includes the first and second diaphragms 52′ and 72′ which are stretched parallelly in a casing (no numeral). As shown, the first diaphragm 52′ defies the atmospheric chamber 54 and the pressure operating chamber 56′. The second diaphragm 72′ defines the pressure operating chamber 56′ and the vacuum operating chamber 74′. The first spring 64′ is located between the inner surface of the casing and the first diaphragm 52′ to bias the first diaphragm 52′ in the downward direction in the drawing. The second spring 66′ is located between the first and second diaphragms 52′ and 72′ to bias the first and second diaphragms 52′ and 72′ in the direction to separate from each other. The third spring 78′ is located between the inner surface of the casing and the second diaphragm 72′ to bias the second diaphragm 72′ in the upward direction in the drawing.

It will be understood that the embodiment shown in FIG. 3 operates substantially the same as that shown in FIG. 2 and therefore the same advantages are obtained.

Otherwise, in the embodiment shown in FIG. 3, substantially the same operation may be carried out even if the vacuum passage 76 is directly connected to the pressure operating chamber 56′ omitting the vacuum operating chamber 74′ and disposing an orifice (not shown) in the pressure passage 60. In this case, in order to increase the EGR rate, it is necessary to decrease the exhaust pressure between the EGR control valve 32 and the orifice 30 by rendering the pressure in the pressure operating chamber 56′ higher than the pressure between the EGR control valve 32 and the orifice 30. In this regard, the pressure in the pressure operating chamber 56′ is controlled to be not lowered by increasing the degree of dilution of the vacuum in the vacuum passage 76 with air.

It will be appreciated that the principle of the present invention is applicable to conventional exhaust pressure controlled EGR control systems without making considerable modifications.

What is claimed is:

1. An EGR (exhaust gas recirculation) control system for an internal combustion engine having means for defining an intake passageway and an exhaust passageway, comprising:

means for defining an EGR passage connecting the exhaust passageway to the intake passageway to recirculate a portion of engine exhaust gases back to the engine;

an orifice formed in said EGR passage to generate the pressure difference between the upstream and downstream sides thereof;

a diaphragm-operated EGR control valve operatively disposed in said EGR passage to control the pressure in the EGR passage downstream of said orifice in accordance with an operating vacuum acting on the diaphragm of said EGR control valve, said operating vacuum being variable in accordance with engine operating conditions;

regulating means for controlling said operating vacuum acting on the diaphragm of said EGR control valve in accordance with the pressure in the EGR passage downstream of said orifice, said regulating means includes a valve member secured to a first diaphragm which is biased with a preset load and receives the pressure in the EGR passage downstream of said orifice, said valve member being movable with the diaphragm of said regulating means and controlling the degree of said operating vacuum acting on the diaphragm of said EGR control valve in accordance with the relationship between said preset load and the pressure acting on the diaphragm of said regulating means; and changing means for substantially changing said preset load of the diaphragm of said regulating means in accordance with the engine operating conditions, said changing means including a second diaphragm connected to said diaphragm; a constant vacuum source whose vacuum is substantially constant regardless of the engine operating conditions; and vacuum control means for controlling the vacuum from said constant vacuum source in accordance with the engine operating conditions and applying said controlled vacuum to one side of said second diaphragm.

2. An EGR control system as claimed in claim 1, in which said EGR control valve includes a movable valve head seatable on a valve seat securely disposed in said EGR passage, the communication between the exhaust and intake passageways being blockable when said valve head is seated on the valve seat, said valve head being securely connected to the diaphragm which defines a first vacuum operating chamber communicable with a vacuum source generating said operating vacuum.

3. An EGR control system as claimed in claim 2, in which said regulating means includes an air induction pipe whose tip is open and closable with said valve member, said air induction pipe being communicable with the first vacuum operating chamber to supply air into the first vacuum operating chamber, a first spring for biasing said first diaphragm in the direction to cause said valve member to separate from the tip of said air induction pipe, a second spring for biasing said first diaphragm in the direction to cause said valve member to close the tip of said air induction pipe, said second spring being located in a pressure operating chamber which is at least partially defined by said first diaphragm and in communication with said EGR passageway downstream of said orifice.

4. An EGR control system as claimed in claim 3, in which said changing means includes a third spring for biasing said second diaphragm to compress said second spring in its axial direction, said second diaphragm defining a second vacuum operating chamber to which is applied said controlled vacuum, said second diaphragm being connected to said second spring to move said second spring with the movement of said second diaphragm.

5. An EGR control system as claimed in claim 4, in which said vacuum control means includes an air induction passage through which said second vacuum operating chamber is communicable with ambient air, valve means for controlling the amount of air inducted through said air induction passage into said second vacuum operating chamber of said spring moving means, and operating means for operating said valve means in accordance with the engine operating conditions.

6. An EGR control system as claimed in claim 5, in which said operating means includes sensing means for sensing the engine operating conditions, and a control circuit for controlling the operation of said valve means in accordance with the engine operating conditions sensed by said sensing means.

7. An EGR control system as claimed in claim 6, in which said regulating means further includes a first casing in which said first diaphragm is securely disposed to separate the interior of said casing into an atmospheric chamber communicable with ambient air and said pressure operating chamber, said first and second springs being located in said atmospheric chamber and said pressure operating chamber, respectively.

8. An EGR control system as claimed in claim 7, in which said changing means further includes a second casing secured to said first casing of said regulating means, a spring retainer for retaining thereon said second spring, said second spring retainer being movably disposed in said pressure operating chamber and mechanically connected to said second diaphragm through a rod which extends out of said first casing of said spring moving means.

9. An EGR control system as claimed in claim 6, further comprising a casing in which said first and second diaphragms are parallelly securely disposed, said first diaphragm defining an atmospheric chamber communicating with ambient air and said pressure operating chamber, said second diaphragm defining said second vacuum operating chamber, said first, second and third springs being disposed in said atmospheric chamber, said pressure operating chamber and said vacuum operating chamber, respectively.

10. An EGR (exhaust gas recirculation) control system for an internal combustion engine having means for defining an intake passageway and an exhaust passageway, comprising:

means for defining an EGR passage connecting the exhaust passageway to the intake passageway to recirculate a portion of engine exhaust gases back to the engine;

an orifice formed in said EGR passage to generate the pressure difference between the upstream and downstream sides thereof;

a diaphragm-operated EGR control valve operatively disposed in said EGR passage to control the pressure in the EGR passage downstream of said orifice in accordance with an operating vacuum acting on the diaphragm of said EGR control valve, said operating vacuum being variable in accordance with engine operating conditions, said EGR control valve including a movable valve head seatable on a valve seat securely disposed in said EGR passage, the communication between the exhaust and intake passageways being blockable when said valve head is seatable on the valve seat, said valve head being securely connected to the diaphragm which defines a first vacuum operating chamber communicable with a vacuum source generating said operating vacuum;

regulating means for controlling said operating vacuum action on the diaphragm of said EGR control valve in accordance with the pressure in the EGR passage downstream or said orifice, said regulating means including a valve member secured to a first diaphragm which is biased with a preset load and receives the pressure in the EGR passage downstream of said orifice, said valve member being movable with the diaphragm of said regulating means and controlling the degree of said operating vacuum acting on the diaphragm of said EGR control valve in accordance with the relationship between said preset load and the pressure acting on the diaphragm of said regulating means, said regulating means including an air induction pipe whose tip is open and closable with said valve member, said air induction pipe being communicable with the first vacuum operating chamber to supply air into the first vacuum operating chamber, a first spring for biasing said first diaphragm in the direction to cause said valve member to separate from the tip of said air induction pipe, a second spring for biasing said first diaphragm in the direction to cause said valve member to close the tip of said air induction pipe, said second spring being located in a pressure operating chamber which is defined at least partially by said first diaphragm and communicating with said EGR passageway downstream of said orifice; and changing means for substantially changing said preset load of the first diaphragm of said regulating means in accordance with the engine operating conditions, said changing means including a second diaphragm at least partially defining a second vacuum operating chamber which is controllably communicable with a constant vacuum source whose vacuum is substantially constant regardless of the engine operating conditions, said second diaphragm being connected to said second spring to move said second spring with the movement of said second diaphragm, a third spring for biasing said second diaphragm to compress said second spring in its axial direction, and vacuum control means for controlling the vacuum from the constant vacuum source in accordance with the engine operating conditions and applying said controlled vacuum to said second vacuum operating chamber.

* * * * *